United States Patent
Kulakowski

(10) Patent No.: US 9,253,544 B2
(45) Date of Patent: Feb. 2, 2016

(54) SYSTEMS AND METHODS FOR DETECTING CLONE PLAYBACK DEVICES

(75) Inventor: Robert Kulakowski, Rancho Santa Fe, CA (US)

(73) Assignee: Verimatrix, Inc., San Diego, CA (US)

( * ) Notice: Subject to any disclaimer, the term of this patent is extended or adjusted under 35 U.S.C. 154(b) by 0 days.

(21) Appl. No.: 12/840,094

(22) Filed: Jul. 20, 2010

(65) Prior Publication Data

US 2011/0030065 A1 Feb. 3, 2011

Related U.S. Application Data

(60) Provisional application No. 61/226,859, filed on Jul. 20, 2009.

(51) Int. Cl.
*G06F 7/04* (2006.01)
*H04N 21/6334* (2011.01)
(Continued)

(52) U.S. Cl.
CPC ........ *H04N 21/6334* (2013.01); *H04N 21/2541* (2013.01); *H04N 21/4108* (2013.01); *H04N 21/24* (2013.01)

(58) Field of Classification Search
CPC .... H04N 21/266; H04N 21/4181; H04L 9/08; H04L 2209/60
USPC .......................................................... 726/26
See application file for complete search history.

(56) References Cited

U.S. PATENT DOCUMENTS 6,158,005 A * 12/2000 Bharathan et al. ............... 726/29
7,006,446 B1 * 2/2006 Anderson ..................... 370/248
(Continued)

FOREIGN PATENT DOCUMENTS

WO 0044174 A1 7/2000

OTHER PUBLICATIONS

International Search Report for International Application PCT/US2010/042642, report completed Oct. 1, 2010, 3 pgs.
(Continued)

*Primary Examiner* — Esther B Henderson
(74) *Attorney, Agent, or Firm* — KPPB LLP

(57) ABSTRACT

Systems and methods are described for aggregating information obtained from messages between playback devices and content protection systems, including but not limited to conditional access systems, downloadable conditional access systems, and digital rights management systems, that include a unique identifier and applying user modifiable rules to the aggregated information to identify abnormal behavior associated with the unique identifier including but not limited to one or more clone playback devices utilizing the unique identifier or a rogue playback device utilizing a unique identifier. One embodiment includes a plurality of playback devices connected to a headend via a network, where the headend includes at least one content protection system, and a clone monitor configured to register playback devices based upon a unique identification supplied by each playback device, when communicating with the at least one content protection system. In addition, the clone monitor is configured to aggregate information associated with each playback device over time, where the information is obtained from messages that are transmitted between the playback device and the headend and that include a unique identifier, and the clone monitor is configured to apply rules to the aggregated information to identify at least one pattern of abnormal behavior in the aggregated information associated with a specific unique identifier.

32 Claims, 8 Drawing Sheets

(51) Int. Cl.
*H04N 21/254* (2011.01)
*H04N 21/41* (2011.01)
*H04N 21/24* (2011.01)

(56) References Cited

U.S. PATENT DOCUMENTS

| | | |
|---|---|---|
| 7,333,923 B1 | 2/2008 | Yamanishi et al. |
| 2004/0236702 A1 | 11/2004 | Fink et al. |
| 2005/0144437 A1 | 6/2005 | Ransom et al. |
| 2007/0067794 A1 | 3/2007 | Russell |
| 2007/0150963 A1* | 6/2007 | Lee et al. .................. 726/27 |
| 2007/0174472 A1* | 7/2007 | Kulakowski ................ 709/229 |
| 2007/0276943 A1 | 11/2007 | Marez et al. |
| 2007/0283162 A1* | 12/2007 | Nonaka et al. .............. 713/184 |
| 2008/0089516 A1 | 4/2008 | Cocchi et al. |
| 2008/0112405 A1* | 5/2008 | Cholas et al. .............. 370/389 |
| 2010/0058047 A1* | 3/2010 | Medvinsky .................. 713/2 |

OTHER PUBLICATIONS

Written Opinion for International Application PCT/US2010/042642, report completed Oct. 1, 2010, 4 pgs.

Supplementary European Search Report for Application No. EP10802795, Search Completed Apr. 30, 2014, 8 pgs.

\* cited by examiner

SYSTEMS AND METHODS FOR DETECTING CLONE PLAYBACK DEVICES

CROSS REFERENCE TO RELATED CASES

This application claims priority to U.S. Provisional Patent Application No. 61/226,859, filed Jul. 20, 2009, the entirety of which is incorporated herein by reference.

FIELD OF THE INVENTION

The present invention generally relates to systems and methods for detecting clone playback devices in a content distribution network and more specifically to systems and methods for detecting clone playback devices utilizing information obtained from messages between playback devices and content protection systems.

BACKGROUND OF THE INVENTION

Conditional Access (CA) technology is commonly used to protect the electronic delivery of digital content. Many CA systems include Downloadable CA (DCAS) systems wherein a secure downloader is used to download a security client to a playback device. Examples of DCAS systems are described in U.S. Pat. Nos. 5,787,172 and 6,456,716 to Arnold, and in U.S. Pat. No. 7,383,438 to Fahrny.

An increasing problem for operators of content distribution systems is the use of illegal duplicate playback devices or clones to access content via the content distribution system. Cloning is typically performed by completely replicating devices or at least replicating information that the system uses to identify a playback device, such as but not limited to a serial number and a media access control (MAC) address. Cloned devices are typically able to operate undetected, because the individual information that the clone has is registered with a legitimate consumer and access from several cloned devices appears to be access from a single legal device to the system.

In one-way networks (e.g. cable or satellite) the cloning of devices is focused on the decryption logic and decryption keys that are used in one legal device. In such a network, all cloned playback devices are able to consume the same content that the original device can consume, and all cloned playback devices will receive key updates and new decryption permissions in the same way.

Potential clones can be detected by observing suspicious patterns of STB behavior of e.g. content consumption or network access. Another method of detecting clones is described in United States Patent Publication No. 2007/0174472 entitled "Network Security System and Method" to Kulakowski et al.

SUMMARY OF THE INVENTION

Systems and methods are described for aggregating information obtained from messages between playback devices and content protection systems, including but not limited to conditional access systems, downloadable conditional access systems, and digital rights management systems, that include a unique identifier and applying user modifiable rules to the aggregated information to identify abnormal behavior associated with the unique identifier including but not limited to one or more clone playback devices utilizing the unique identifier or a rogue playback device utilizing a unique identifier.

One embodiment includes a plurality of playback devices connected to a headend via a network, where the headend includes at least one content protection system, and a clone monitor configured to register playback devices based upon a unique identification supplied by each playback device, when communicating with the at least one content protection system. In addition, the clone monitor is configured to aggregate information associated with each playback device over time, where the information is obtained from messages that are transmitted between the playback device and the headend and that include a unique identifier, and the clone monitor is configured to apply rules to the aggregated information to identify at least one pattern of abnormal behavior in the aggregated information associated with a specific unique identifier.

In a further embodiment, the clone monitor is configured to intercept messages from the playback device to the headend, records information obtained from the intercepted messages and forwards the intercepted messages to the headend.

In another embodiment, the clone monitor is configured to obtain information from messages transmitted between the playback device and the at least one content protection system that include a unique identifier.

In a still further embodiment, the content protection system is part of a conditional access system.

In still another embodiment, the content protection system is part of a downloadable conditional access system.

In a yet further embodiment, the content protection system is part of a digital rights management system.

In yet another embodiment, the clone monitor is configured to obtain information from messages transmitted between the playback device and a plurality of content protection systems.

In a further embodiment again, the clone monitor is part of the headend.

In another embodiment again, the clone monitor is configurable to enable user modification of the rules.

In a further additional embodiment, the abnormal behavior is indicative of the presence of at least one playback device clone utilizing a unique identifier.

In another additional embodiment, the abnormal behavior is indicative of a rogue playback device utilizing a unique identifier.

A still yet further embodiment includes a server configured to receive messages from a plurality of playback devices, where each message includes a unique identifier. In addition, the server is configured to register the unique identifiers in a database and associate information obtained from the received messages with the unique identifiers, the server is configured to forward the received messages to a content protection system, and the server is configured to query the database using rules that detect patterns of abnormal behavior.

In still yet another embodiment, the content protection system is part of a conditional access system.

In a still further embodiment again, the content protection system is part of a downloadable conditional access system.

In still another embodiment again, the content protection system is part of a digital rights management system.

In a still further additional embodiment, the rules detect patters indicative of the presence of at least one clone playback device utilizing a specific unique identifier.

In still another additional embodiment, the rules detect patterns indicative of the presence of a rogue playback device utilizing a specific unique identifier.

In a yet further embodiment again, the server is configured to decyrpt at least a portion of the received messages.

In yet another embodiment again, the unique identifier is selected from the group consisting of a network address, a random number, an identifier generated from playback device behavior, and a hardware identifier.

In a yet further additional embodiment, the information obtained from the received messages includes information indicative of content consumption.

In yet another additional embodiment, the information obtained from the received messages includes the geographic location of a playback device.

In a further additional embodiment again, the information obtained from the received messages includes requests for content decryption keys.

In another additional embodiment again, the clone monitor is configured to block messages including unique identifiers after the detection of a pattern of abnormal behavior.

An embodiment of the method of the invention includes intercepting messages between playback devices and at least one content protection system, where each message includes a unique identifier, registering each unique identifier in a database, associating information obtained from the intercepted messages with the unique identifiers in the database, and querying the database to identify patterns of abnormal behavior associated with specific unique identifiers.

In a further embodiment of the method of the invention, the at least one content protection system is part of conditional access system.

In another embodiment of the method of the invention, the at least one content protection system is part of a downloadable conditional access system.

In a still further embodiment of the method of the invention, the at least one content protection system is part of a digital rights management system.

In still another embodiment of the method of the invention, messages including a unique identifier are intercepted between playback devices and a plurality of content protection systems.

In a yet further embodiment of the method of the invention, the queries identify patterns of abnormal behavior indicative of the presence of at least one clone device utilizing a unique identifier.

In yet another embodiment of the method of the invention, the queries identify patterns of abnormal behavior indicative of the presence of a rogue playback device utilizing a unique identifier.

A further embodiment again of the method of the invention also includes decrypting at least a portion of the intercepted messages.

Another embodiment again of the method of the invention also includes forwarding information from the intercepted messages to a global clone monitor.

In a further additional embodiment of the method of the invention, the unique identifier is selected from the group consisting of a network address, a random number, an identifier generated from playback device behavior, and a hardware identifier.

In another additional embodiment again of the method of the invention, the information obtained from the received messages includes information indicative of content consumption.

In a still yet further embodiment of the method of the invention, the information obtained from the received messages includes the geographic location of a playback device.

In still yet another embodiment of the method of the invention, the information obtained from the received messages includes requests for content decryption keys.

A still further embodiment again of the method of the invention also includes blocking messages including unique identifiers after the detection of a pattern of abnormal behavior.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Turning now to the drawings, clone monitoring systems that aggregate information associated with unique identifiers used by playback devices and detect patterns indicative of abnormal behavior in accordance with embodiments of the invention are illustrated. In a number of embodiments, the clone monitoring system identifies patterns of behavior indicative of the presence of one or more clone devices utilizing a unique identifier within a content distribution system. In several embodiments, the clone monitoring system identifies patterns of behavior indicative of the presence of a rogue device with a content distribution system. In many instances, the clone monitoring system includes a clone monitor that intercepts messages between a playback device and a content protection system such as, but not limited to, a Conditional Access (CA) system, a Downloadable Conditional Access System (DCAS), or a Digital Rights Management (DRM) system. Typically, such messages attempt to uniquely identify the playback device and information from the messages can be associated with the unique identifier. An advantage of utilizing a clone monitor that intercepts messages in accordance with an embodiment of the invention is that the clone monitor can be installed in an existing content distribution system without the need to modifying the content protection systems within the content distribution system. In several embodiment, a global clone monitor is utilized to aggregate information from multiple clone monitors. Global clone monitors can detect abnormal behavior associated with a device or a domain of devices across multiple content distribution systems and/or across multiple networks within a content distribution system. Clone monitors, detection of abnormal behavior, and global clone monitoring systems in accordance with embodiments of the invention are discussed further below.

Clone Monitoring Systems

Figure 1:
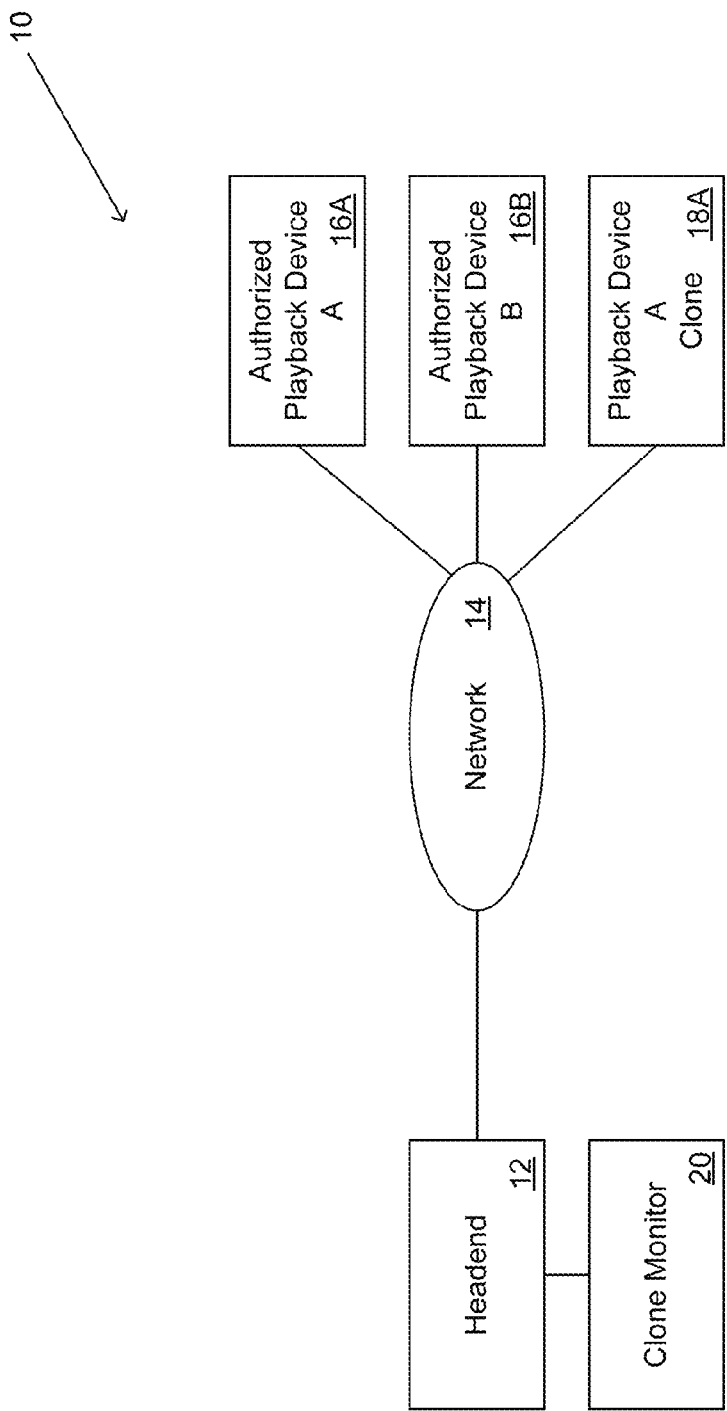
FIG. 1 illustrates a content distribution system including a clone monitor configured to communicate with a headend in accordance with an embodiment of the invention.

A content distribution system including a clone monitor in accordance with an embodiment of the invention is illustrated in FIG. 1. The content distribution system 10 includes a headend 12 connected via a network to a variety of playback devices. Authorized playback devices 16A, and 16B are shown, which are playback devices that are authorized by the operator of the content distribution system to participate within the content distribution system. A clone playback device 18A is also shown. The clone playback device is a replica of an authorized playback device that receives content via the content distribution permission in a manner that is not authorized by the operator of the content distribution network. The content distribution system also includes a clone monitor 20 connected to the headend.

The headend 12 is typically responsible for managing the distribution of content via the network 14, which can be any kind of network including but not limited to a cable, hybrid fiber coaxial, IPTV, satellite, Internet, or terrestrial network. As such the headend is, amongst other things, responsible for handling messaging associated with any Conditional Access (CA) or Digital Rights Management (DRM) systems supported by the content distribution network. CA systems typically relate to non-persistent content, and involve encryption of the transmitted stream. A common CA system is the CA system specified under the DVB standard, which involves use of Entitlement Control Messages and Entitlement Management Messages to control the playback devices that can access specific content. DRM systems typically relate to persistent content protection and encrypt the bits of the content in their stored state. DRM systems are typically characterized in that playback, location, and aging authorization is performed in the playback device. As is discussed further below, headends in accordance with embodiments of the invention can utilize combination of CA and/or DRM systems including multiple CA and/or DRM systems. Examples for DRM systems include Microsoft PlayReady, Window Media DRM, Adobe Rash Access, Marlin and OMA. Providers of CA systems include Verimatrix, Nagra and Irdeto. Other systems that are applicable for this invention include systems that control access rights using encryption standards like AACS to deliver content to CE devices and standards that include encryption format and other aspects like DECE, CableLabs TV everywhere, OIPF, Project Canvas.

Both CA systems and DRM systems can be considered as different types of content protection systems. As is discussed further below, clone monitors in accordance with embodiments of the invention monitor messages between playback devices and content protection systems and use the information contained within the messages to detect clone and rogue playback devices. Messages between playback devices and content protection systems are particularly suited to the task of clone detection, because the messages typically contain information that is designed to enable the unique identification of the playback device by the content protection system. Although clone monitors are generally discussed below in the context of monitoring information in messages between playback devices and content protection systems, messages between playback devices and other types of systems where the playback device attempts to uniquely identify itself to system can also be monitored in accordance with embodiments of the invention.

In the illustrated embodiment, the clone monitor 20 extracts information concerning messages received from playback devices by the content protection systems (i.e. the CA and/or DRM systems) in the headend and uses the information concerning messages to detect playback devices that exhibit the characteristics of clone playback devices or the characteristic of rogue playback devices that are faulty or being used by hackers/pirates in an unauthorized manner. Types of messages that are typically received from playback devices at the headend 12 include but are not limited to messages associated with device registration, user account messages, usage right requests, right locker accesses, and/or messages associated with super distribution of digital content. The manner in which a clone monitor can detect clone and/or rogue playback devices based upon messages transmitted between the playback devices and the headend in accordance with embodiments of the invention is discussed further below. In the event that the clone monitor detects a clone or rogue playback device, the global clone monitor can indicate results of clone detection processing to other system components such as middleware or billing systems in the headend that handle revocation management. Although the clone monitor is shown as being separate to the headend, clone monitors can also be integrated into the headend either as part of or with modules incorporated within the content protection system or systems (i.e. one or more CA, DCAS, and/or DRM systems) incorporated within the headend. As is discussed further below, clone monitors can also be located elsewhere in the content distribution system in accordance with embodiments of the invention. In many embodiments, a clone monitor can be implemented on a dedicated server or on a cloud based computing system. The clone monitor typically includes a database management system to enable the construction and querying of a database of information aggregated by the clone monitor based upon messages between playback devices and a headend.

The playback devices illustrated in FIG. 1 can take any of a variety of forms including but not limited to set top boxes, mobile phones, portable media players, and game consoles or any other device capable of playing back digital content and that incorporates a security system including but not limited to a CA system, a DRM system, and/or multiple types of security systems such as a Downloadable Conditional Access System (DCASS) system with one or more CA systems, and/or DRM systems.

Detecting Clone and Rogue Playback Devices

Figure 2:
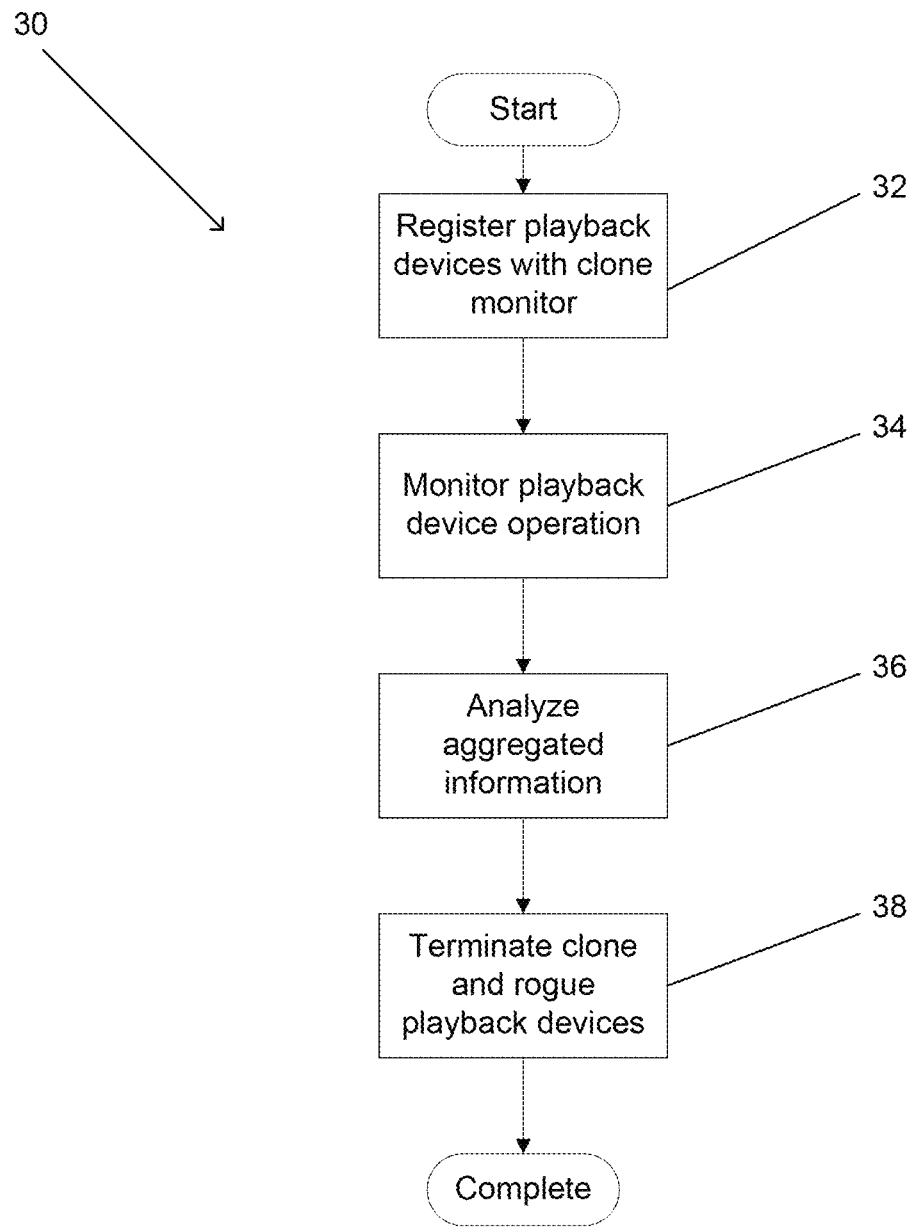
FIG. 2 is a flow chart illustrating a process for detecting and terminating clone and/or rogue playback devices in accordance with an embodiment of the invention.

A process for detecting clone and rogue playback devices in accordance with an embodiment of the invention is illustrated in FIG. 2. The process 30 involves registering (32) playback devices with the clone monitor. In many embodiments this is performed automatically as the playback devices register with the content distribution system. As the playback devices are used to view and purchase content, messages between the playback devices and the various CA and/or DRM systems at the headend are monitored (34) by the clone monitor. The clone monitor aggregates (36) the message information across all playback devices and then applies rules and/or statistical analysis to detect devices that are behaving abnormally. The headend system or clone monitor can then terminate playback devices that exhibit characteristics determined to be associated with clone or rogue playback devices.

The process illustrated in FIG. 2 typically assumes that each playback device has a unique ID, which is a public identifier for the client device and is preferably unique to each physical device manufactured. Where a unique ID is available, the unique ID is used for playback device identification. Examples of unique IDs that can be used by clone monitors in accordance with embodiments of the invention include but are not limited to a unique ID derived from a MAC address, a unique ID associated with a DCAS system. When a unique ID is not available, clone monitors in accordance with embodiments of the invention can provide a unique ID to the client device from the headend or by mapping a non-unique ID to a unique ID. For example, the headend can send a unique ID to a playback device when the playback device registers with the content delivery system. In other embodiments, playback devices can generate unique IDs using techniques including but not limited to randomly generating a number and/or combining the randomly generated number with information derived from characteristics of the device such as a software or firmware version. In many systems, a unique ID is displayed using the playback device during registration and this unique ID is provided to an operator via text message or by reading the unique ID to an operator during a registration process. In some embodiments the users behavior is used to create a random ID. A unique ID generator can be in the headend, or client, or a combination of both, and can use static data, random data, or transformed data (for example hashed or otherwise processed data) in any combination. It can be readily appreciated that when each playback device within a content distribution system generates a sufficiently large random number or pseudo random number, the number will be unique with a large probability.

Generating Unique Identifiers for Each Playback Device

The ability of a clone monitor to detect clone or rogue playback devices can be significantly enhanced through the use of systems to protect data transmitted between a content protection system, including but not limited to a CA, DCAS, and/or DRM system, and a playback device that include the capability of using a different (i.e. unique or pseudo-unique) set of processing steps for protecting data sent to different playback devices. Examples of such systems include the system described in United States Patent Publication 2007/0174472 the disclosure of which is incorporated by reference herein in its entirety. The use of such a system enables the generation of what is effectively a unique identifier for each playback device during normal usage. The unique identifier can combine the physical identifiers of the playback device with a specific fingerprint related to operational events and the usage pattern of the playback device. As such, unique identification can be performed in any type of content distribution system including systems where the physical network topology connecting a playback device to the network cannot be uniquely identified, or where a single physical connection may support multiple playback devices. The unique identification highlights clones, because a clone monitor can observe devices with the same device ID receiving messages that are protected using different sequences of processes characteristic of different devices. The process is also particularly effective for client monitoring in systems where there is not a persistent two-way connection with the playback device. Systems that enable the use of unique processing steps for protecting data sent to different playback devices are described in U.S. patent application Ser. No. 12/122,303 entitled "System and Method for Defining Programmable Processing Steps Applied when Protecting the Data", to Kulakowski et al., filed May 16, 2008, the disclosure of which is incorporated by reference herein in its entirety.

Utilizing Unique IDs in Clone Detection

Figure 6A:
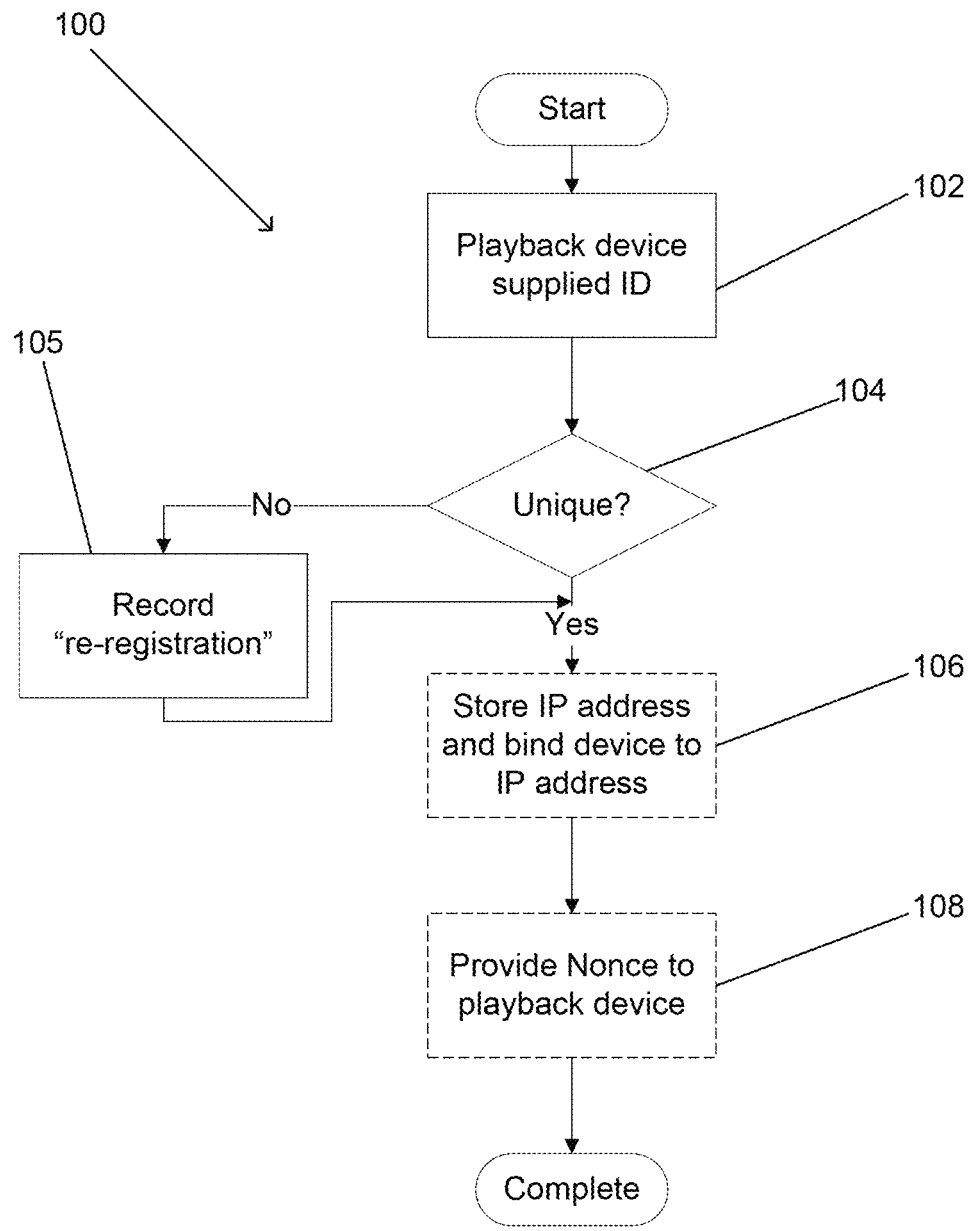
FIGS. 6a and 6b are flow charts illustrating processes for collecting information concerning playback devices in accordance with embodiments of the invention.
Figure 6B:
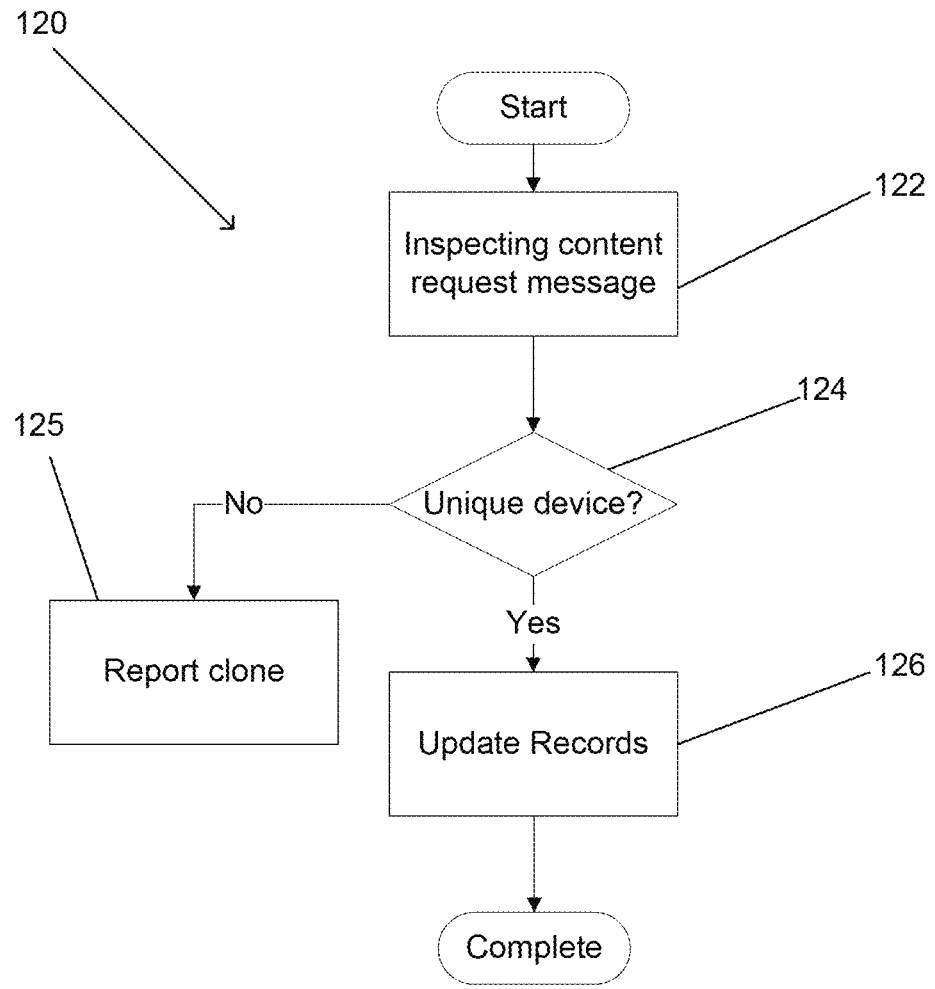

As noted above, many different rules can be applied by clone monitors to detect clone and/or rogue devices. A common way to immediately detect the presence of a clone is to obtain or assign a unique ID to the clone using any of the techniques outlined above. Often, assigned IDs are available since the device must be positively identified in order to receive service. Once the unique ID is registered or assigned, the clone monitor can compare information in future messages associated with the unique ID and use discrepancies to identify clone playback devices. The process is illustrated in FIGS. 6a and 6b with respect to messages generated by a playback device that does not contain secure hardware. In FIG. 6a a new playback device is registered within a content distribution system. During the registration process 100, the playback device supplies (102) an ID, which is checked to determine (104) whether the ID has previously been registered. In the event that the ID is not unique, then the presentation of a non-unique ID is recorded (105) for the purposes of clone detection. The presentation of a non-unique ID is not necessarily indicative of a clone. For example, rebooting a playback device will often result in the device re-registering with the content distribution network. Repeated presentation of the same unique ID to a content protection system increases the likelihood that multiple playback devices are presenting the unique ID to the content protection system. In the event that the ID is unique, the system can optionally store (106) the IP address of the playback device and associate the IP address with the ID in the records maintained by the clone monitor. The CA, DCAS, and/or DRM systems can also optionally provide a Nonce (number only used once) or another piece of information to enable the use of a unique process to protect data transmitted to the playback device (see discussion above).

In FIG. 6b, a previously registered playback device performs a content request and the clone monitor inspects the content request to determine whether the playback device is a clone. The process 120 commences by inspecting (122) the content request message from the playback device to determine the ID specified in the message and any other information such as the IP address of the device. The information identifying the playback device obtained from the message is then checked to determine (124) whether it, in combination with the records maintained by the clone monitor, correspond to a pattern indicative of abnormal behavior. In the event the information corresponds with a pattern of abnormal behavior, the playback device is reported (125) to the operator of the content distribution system as a likely clone. When the information does not result in the flagging of abnormal behavior, then the clone monitor updates (126) its records and applies user modifiable rules to flag behavior indicative of a clone or a rogue playback device. Although the process shown in FIG. 6a involves the application of rules to detect abnormal behavior in real time, many systems in accordance with embodiments of the invention perform batch processing of aggregated information to detect patterns of abnormal behavior.

Although specific processes are described above with respect to FIGS. 6a and 6b, any of a variety of processes can be utilized in accordance with embodiments of the invention to detect clone and rogue playback devices based upon information contained within messages in which playback devices uniquely identify themselves.

Message Monitoring

As can readily be appreciated, the types of messages related to content protection systems, including but not limited to CA, DCAS, and/or DRM systems, that are transmitted in a content delivery system in accordance with embodiments of the invention largely depend upon the specific content protection systems present within the content delivery system. Messages can arise as a result of any of a variety of activities including but not limited to the provisioning or downloading of CA systems, the downloading of new firmware to a device, account and user management, the addition and removing of devices, purchasing rights to content, downloading content on demand, applications, access to license or decryption keys and/or channel changes. The following listing is typical of the types of information that can be extracted from messages transmitted within a content delivery system between playback devices and content protection systems:

Time/date of request at server
    MAC address
    IP address
    Request type
    Request status
    Subject key
    Transaction ID
    Server ID
    VOD asset ID
    Channel number
    Channel count As can be readily appreciated, the list of information collected by a clone monitor in any specific application depends upon the messages transmitted within the system between playback devices and content protection systems.

Processes for Detecting Clones

There are a wide range of monitoring processing steps that can be used to identify clones and abnormal behavior based upon messages transmitted between playback devices and content protection systems. Clones are typically determined by observing the behavior of playback devices and detecting unusual activities in network access, content access or client software behavior over time. For example, if two devices that look identical to the headend consume content, the headend will not be able to detect the fact that there are two instead of one device, unless the headend detects that the device is accessing two different movie files at the same time. In that case, it is suspected that there are several devices. Therefore, clone detection processes in accordance with embodiments of the invention involve gathering information from messages transmitted by playback devices and, depending on the available information, determining the likelihood of the observed messages being plausibly transmitted by a single playback device.

Many types of behavior are characteristic of a clone or a rogue including but not limited to the time of day or the number of times an action is performed that is associated with a unique ID (e.g. a MAC address), the number of messages or requests associated with a unique ID within a predetermined time period, the number of power-on resets performed, channel changes, number of errors observed, detection of a playback device connecting from multiple network connections, detecting a single playback connecting simultaneously from multiple difference network connections, detecting a playback device connecting from geographically disparate locations within a short time period (typically based upon a geographic reverse lookup of an IP address), a playback device requesting multiple keys and licenses in frequent intervals, content consumption of several different media at the same time, and multiple playback devices responding to a "broadcast ping" addressed to a specific unique ID. Accordingly, by aggregating information concerning a playback device and the consumption of content by the playback device over time, rules can be applied to the aggregated information to identify patterns that are indicative of a clone or rogue playback device. The specific rules largely depend upon the information available from content protection systems and other systems within one or more content distribution networks. In addition, the rules can vary depending upon the content consumption habits of users that consume content via a specific content distribution network.

A clone monitor in accordance with an embodiment of the invention can use a set of user modifiable rules to flag behavior indicative of a clone or a rogue playback device. Examples of rules that can be applied include but are not limited to flagging a unique ID as being associated with suspicious activity where the number of invalid session keys exceeds a predetermined number, the number of movie keys issued to the unique ID exceeds a predetermined number, the number of error messages associated with the unique ID exceeds a predetermined number, the number of error messages in combination with the number of movie keys associated with a unique ID both exceed predetermined numbers, the number of session keys issued to a specific unique ID exceeds a predetermined number, or the number of certificates issued to a specific unique ID exceeds a predetermined number. In effect, clone monitors can utilize any rule based upon information obtained by observing messages between playback devices and one or more content protection systems within a content description system that enable the detection of clone or rogue playback devices in accordance with embodiments of the invention.

Intercepting Messages

Figure 3:
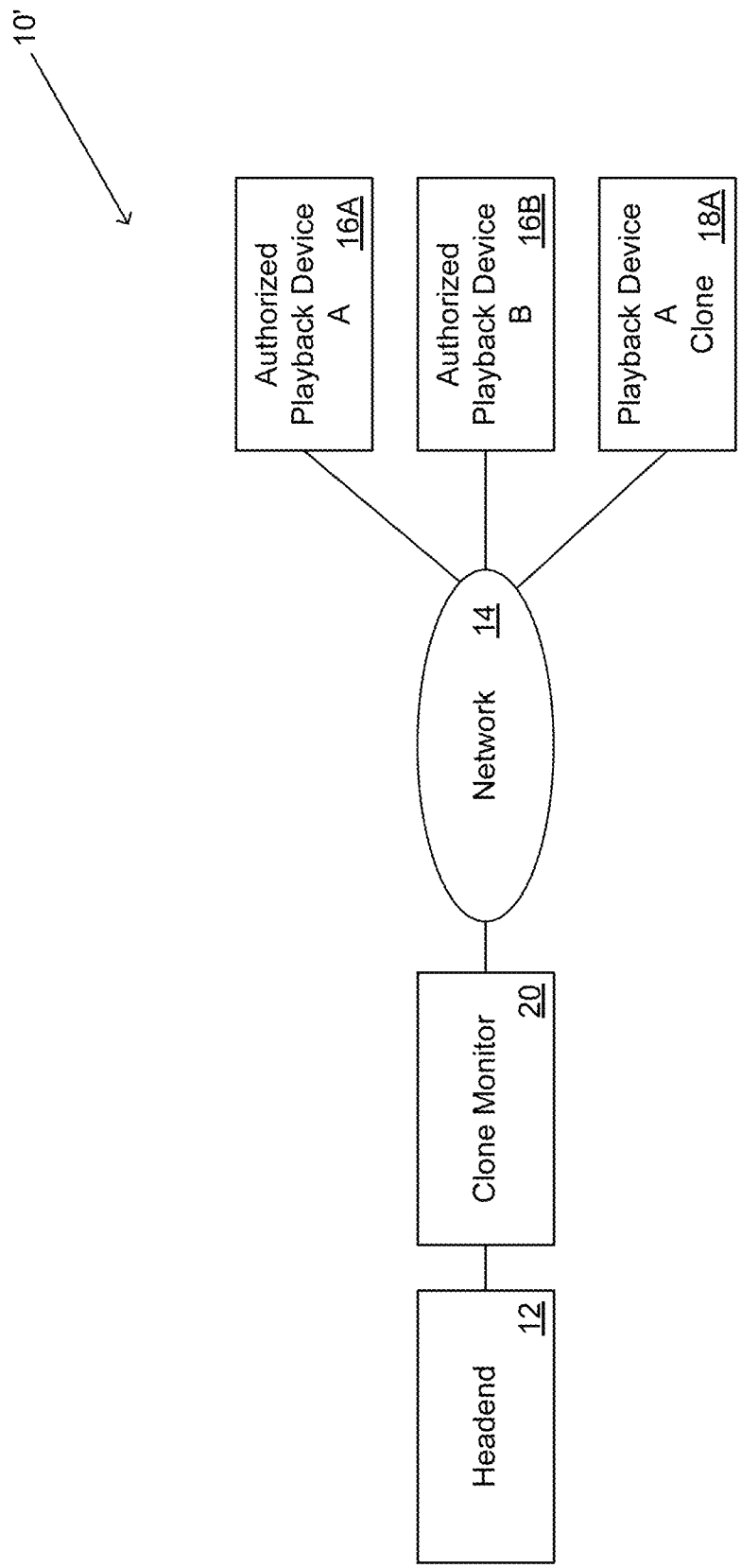
FIG. 3 illustrates a content distribution system in which a clone monitor intercepts messages between playback devices and a headend in accordance with an embodiment of the invention.

A clone monitor in accordance with embodiments of the invention can operate independently of the headed of a content distribution system. A clone monitor that intercepts messages between playback devices and content protection systems in a headend in accordance with an embodiment of the invention is illustrated in FIG. 3. The system 10' illustrated in FIG. 3 is similar to the system 10 shown in FIG. 1 with the exception that the clone monitor 20 is connected to the network and not directly connected to or part of the headend. The operation of the clone monitor 20 is similar in that it utilizes information collected from monitoring communication between the playback devices and the content protection systems within the headend. The clone monitor does not have access to the information accumulated by the headend, however. Instead, the clone monitor intercepts messages intended for content protection systems within the headend and uses the intercepted messages to collect information that can be processed to detect clone and rogue playback devices.

Existing content distribution systems can be easily adapted to incorporate a clone monitor in this fashion. The clone monitor can be by acting as a headend to the client and as a client to the headend, decrypting and re-encrypting the messages between the devices, similar to a type of system known as a proxy or an attack scheme known as a "man-in-the-middle" attack. In this way, the clone monitor receives messages from playback devices, records useful information, and forwards the messages to the relevant CA, DCAS, and/or DRM system. A variety of ways in which a clone monitor can be incorporated into different types of content distribution systems in accordance with embodiments of the invention are discussed below.

Clone Monitoring in Systems Incorporating a DCAS Authority

Figure 4:
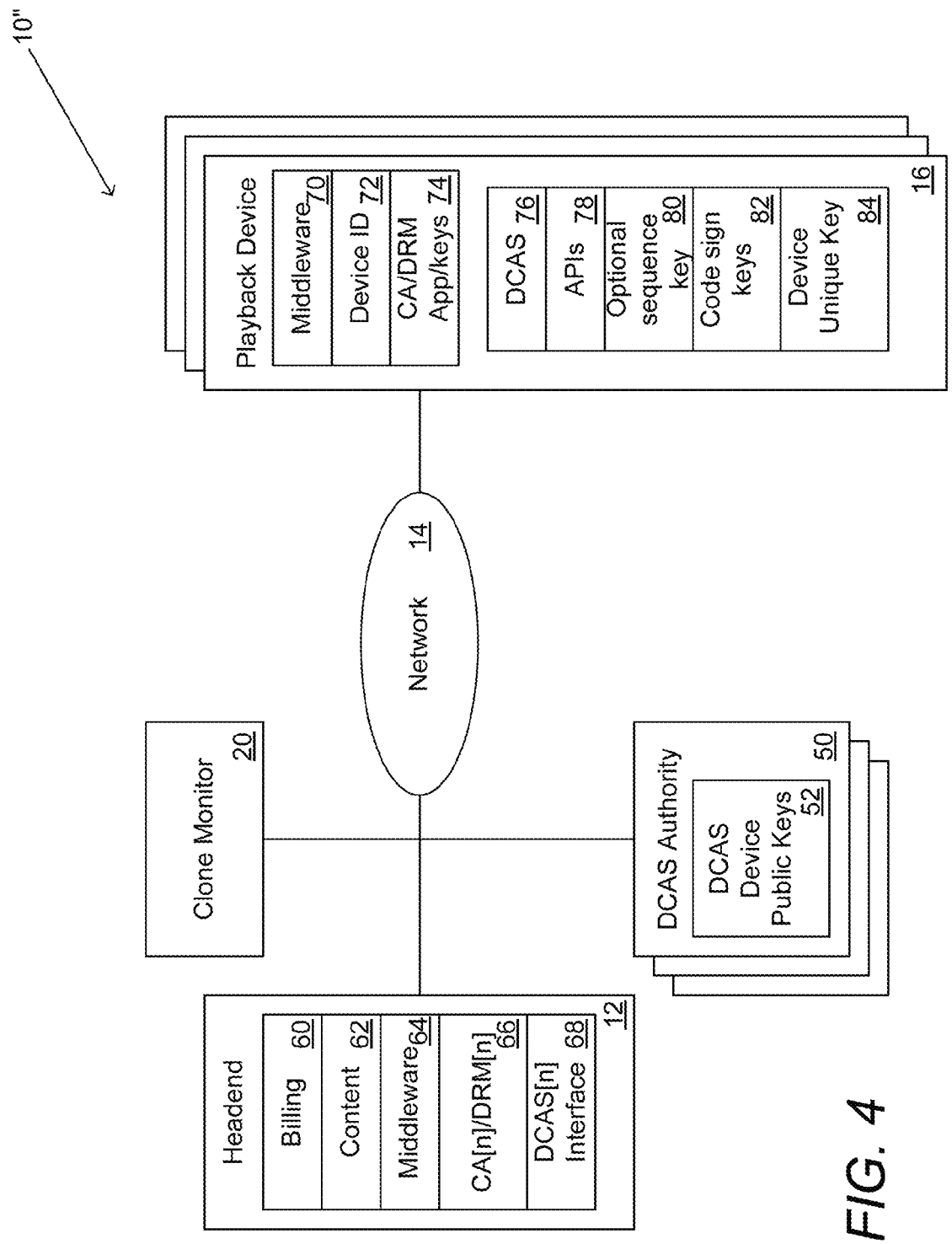
FIG. 4 illustrates a content distribution system incorporating at least one downloadable conditional access system in which a clone monitor intercepts messages between playback devices and content protection systems including the at least one downloadable conditional access system in accordance with embodiments of the invention.

A typical content distribution system including a DCAS system and a clone monitor to detect clone and/or rogue playback devices in accordance with embodiments of the invention is illustrated in FIG. 4. In the illustrated embodiment, the headend 12 provides content to playback devices 16 utilizing a DCAS system. DCAS systems, which can be considered to be a type of content protection system, are typically characterized by a security system including a download root-of-trust called a DCAS Authority 50. The DCAS Authority 50 includes public keys 52 for the playback devices 16 in the system and in many DCAS systems the DCAS Authority established the core root-of-trust for the system. An example of a proposed DCAS Authority is CABLELABs performing system root-of-trust operation for U.S. based cable television providers.

In the illustrated embodiment, the headend includes systems that perform many of the basic functions of a headend in a content distribution system such as but not limited to billing systems 60, content broadcasting and/or on-demand systems 62, and middleware 64 for handling subscriber management. In addition, the headend 12 includes a DCAS Interface 68 and systems to support one or more CA and/or DRM systems 66. In many embodiments, multiple DCAS systems are used within a content distribution system and the headend includes interfaces to each DCAS system.

A playback device 16 configured to download a DCAS system is illustrated in FIG. 4. The playback device includes middleware 70, and a hardware device ID 72, and memory securely storing cryptographic keys 74 associated with CA and/or DRM systems supported by the playback device. The DCAS system 76 can include APIs 78, code sign keys 82, and a unique key for the device 84. As noted above, each playback device can also include the capability of receiving information encrypted using a process or sequence of steps that is unique to the specific playback device. Accordingly, the playback device can include a sequence key 80 defining the sequence of steps utilized to obtain protected information intended for the playback device in the clear.

As discussed above with respect to FIG. 3, the clone monitor 20 intercepts messages within the content distribution system 10" to detect clone or rogue playback devices. In various embodiments, the clone monitor only monitors messages from the playback devices related to one of the DCAS, the CA, or the DRM systems. In other embodiments, the clone monitor monitors messages from a combination of the DCAS, CA, and/or DRM systems. As discussed above with respect to FIG. 2, the clone monitor can aggregate information concerning individual playback devices over time from the intercepted messages and apply a set of user modifiable rules to flag behavior indicative of a clone or a rogue playback device.

The operation of a clone monitor is shown in the context of a typical content distribution system including one or more DCAS systems and one or more CA and/or DRM systems in FIG. 4. The operation of clone monitors in other contexts is discussed further below.

Playback Domains

The clone monitors described above can be used to monitor messages between a number of different types of playback devices that participate in a different content protection systems, including but not limited to CA, DCAS, and/or DRM systems. In many instances, the content distribution system can support the supply of content from multiple content providers and playback devices can be associated with domains related to user accounts. As noted above, a clone monitor can monitor messages across multiple CA, DCAS, and/or DRM systems. In addition, the clone monitor can monitor messages passing between playback devices and systems that enable playback of content with a domain of devices, where the devices within the domain may participate in different content protection systems. Where device domains are enabled through the use of rights lockers, the clone monitor can intercept content locker requests between the playback device and the content locker. As can be readily appreciated, the messages monitored by the clone monitor largely depend upon the specific system utilized to support playback domains.

Typically, billing systems and/or middleware within content distribution systems will perform playback domain management for playback devices containing different DRM systems. The clone monitor can perform DRM specific processing to identify a DRM type for a particular playback device and then monitor the operation of each of the different DRMs deployed in the system. In this way, a content monitor can intercept messages associated with multiple content protection systems and aggregate the information across different playback devices and playback domains.

Intercepting Messages in a DRM System

Figure 5:
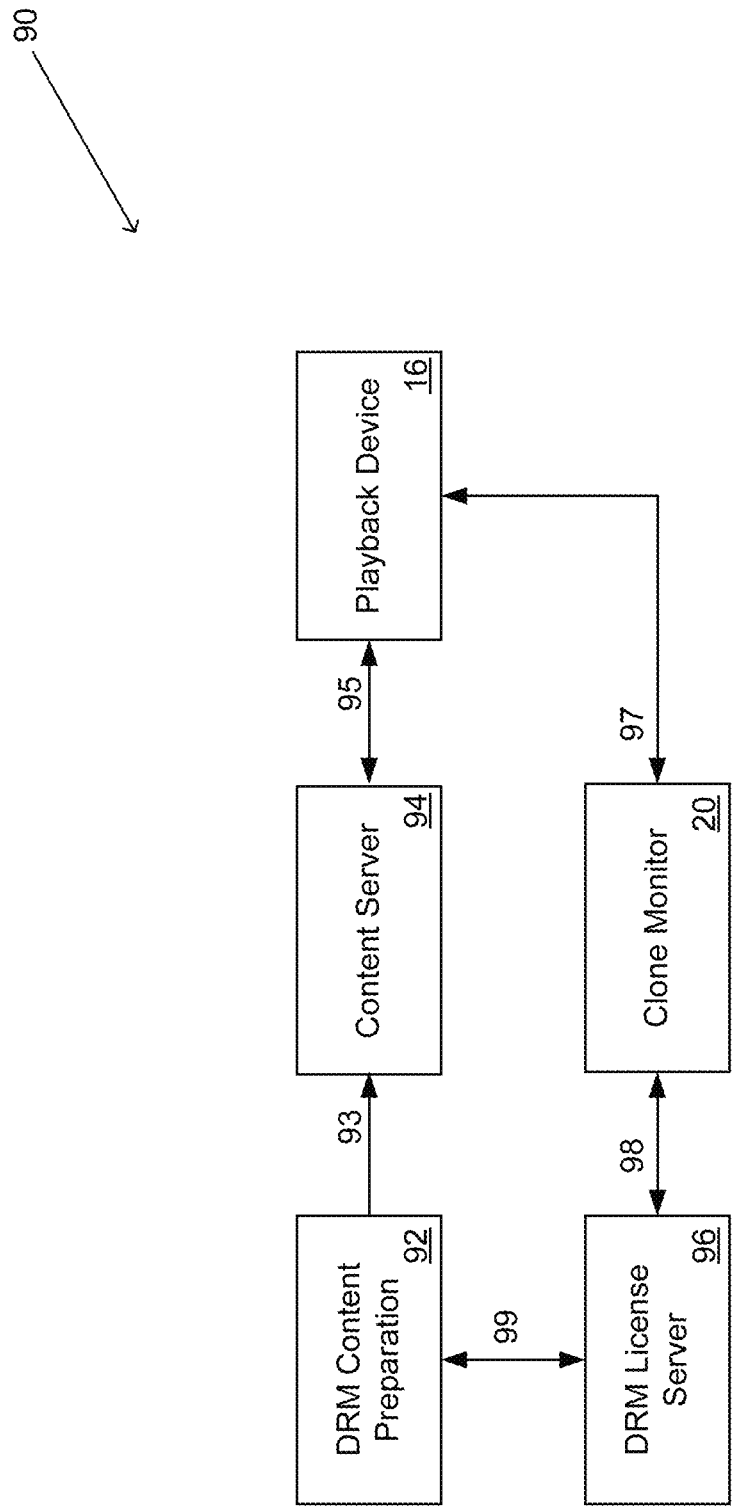
FIG. 5 illustrates a digital rights management system in which a clone monitor intercepts messages between a playback device and a digital rights management server in accordance with an embodiment of the invention.

As noted above, a clone monitor can be used in conjunction with a single security system. A clone monitor that monitors messages sent between a playback device and a DRM system in accordance with an embodiment of the invention is conceptually illustrated in FIG. 5. The content distribution system 90 is simplified to show the flow of content and messages within the system. The DRM Content Preparation server 92 provides (93) DRM protected content to a content server 94. The playback device 16 can request (95) DRM protected content from the content server 94. In order to play back the content, the DRM software on the playback device 16 sends a message to a DRM license server 96 containing a content key request. In a typical DRM system, the DRM license server 96 receives the request from the playback device 16 and determines whether the playback device has permission to playback the DRM protected content and, where appropriate, delivers a cryptographic key enabling playback of the content. In the illustrated embodiment, a clone monitor 20 intercepts (97) messages in the manner outlined above and records information concerning the playback device based upon the content of the message and then forwards (98) the message to the DRM license server 96 for processing. In this way, the clone monitor can aggregate information enabling the detection of clones and rogue playback devices without modifying the DRM software on the playback device and without modifying the DRM license server.

The specific messages that pass between a playback device and a DRM license server and the information that can be obtained by a client monitor intercepting the message depends upon the specific DRM system. A number of DRM systems, including but not limited to the Window Media DRM specified by Microsoft Corporation of Redmond Wash., utilize license key request Uniform Resource Locators (URLs). In this DRM a license key request is made using a license acquisition URL within the function call as shown below:

URL_Request_License_Server (client_ID, content_ID)

The above exemplifies the license key request for client_ID and content_ID, made to a DRM license server. The URL for the DRM license server may be the IP address of the DRM license server. Content distribution systems in accordance with embodiments of the invention set the URL to be the IP address of a clone monitor to enable the clone monitor to intercept the license key request in the manner outlined above. The clone monitor can record the time, date, MAC address used by the playback device, IP address used by the playback device, client_ID used by the playback device, and the content_ID requested by the playback device. By aggregating this information over time and across all playback devices the clone monitor can apply user modifiable rules to flag behavior indicative of a clone or a rogue playback device.

An alternative to modifying the URL for the DRM license server is to embed a URL in the content that encapsulates the license key request URL and directs the license key request URL to the clone monitor for forwarding to the DRM license server. An example of that encapsulation of the native DEM license key request as follows:

URL_CM(URL_License_Server (client_ID, content_ID))

Although the process described above involves the clone monitor transparently intercepting unmodified DRM messages, content distribution systems can utilize playback devices in which the DRM software specifically routes DRM messages to the clone monitor for forwarding to a DRM license server in accordance with embodiments of the invention. For example, a mini-client can be added to the playback device that supplies a unique ID that is added to the native DRM messaging and is removed by the client monitor so that only the native DRM message data is forwarded to the DRM license server. In another example, a DRM that uses completely encrypted messages will not expose client ID data and for such a system a clone detection mini-client application can be provided to expose interfaces to enable the mini-client to obtain information such as the client_ID, content_ID of a DRM key request for forwarding to the clone monitor. Only the API function call addresses change and the API interfaces are the same when the clone detection mini-client is included or not included. In this way, the clone detection mini-client can pass the API interface calls and data from the client firmware to the native DRM without changes to the playback device or native DRM software. When a clone detection mini-client is present on a playback device, other interfaces can be created to provide more information to the clone monitor. For example, such interfaces can include but are not limited to calling a clone detection mini-client API when a button is pressed, when the device is powered ON, or when a piece of content is played. In addition, any of a variety of other techniques can be used to pass data through or have data visible to the clone monitor in accordance with an embodiment of the invention.

Intercepting Messages in a Other System Components

While DRM systems and other types of content protection systems are particularly suited for clone detection because the client server communication is enforced and several security requirements are in place, other systems can be used to observer the behavior of client device and be used for or help in the determination of likely clones. These systems include content access systems such as VOD servers or CDN servers, billing systems, content guides and display systems, (also called middleware).

Global Clone Monitoring

In a number of embodiments, a global clone monitor is provided that aggregates information collected by a plurality of clone monitoring systems that operate within different content distribution networks or within discrete parts of a content distribution network. By aggregating information across multiple content distribution networks, the global clone monitor has more information available to it when applying user modifiable rules to detect abnormal behavior associated with a unique identifier or a domain that may be indicative of the presence of one or more clone playback devices or the presence of a rogue playback device. Global clone monitors can be particularly effective where clone playback devices are utilized on different networks. If clone detection is active on one network, an attempt may be made to use a clone playback device on another network to avoid detection. By aggregating information across multiple networks, a global clone monitor possesses the ability to detect clone playback devices even when they are connected to a different network than the authorized playback device, which is being cloned.

Figure 7:
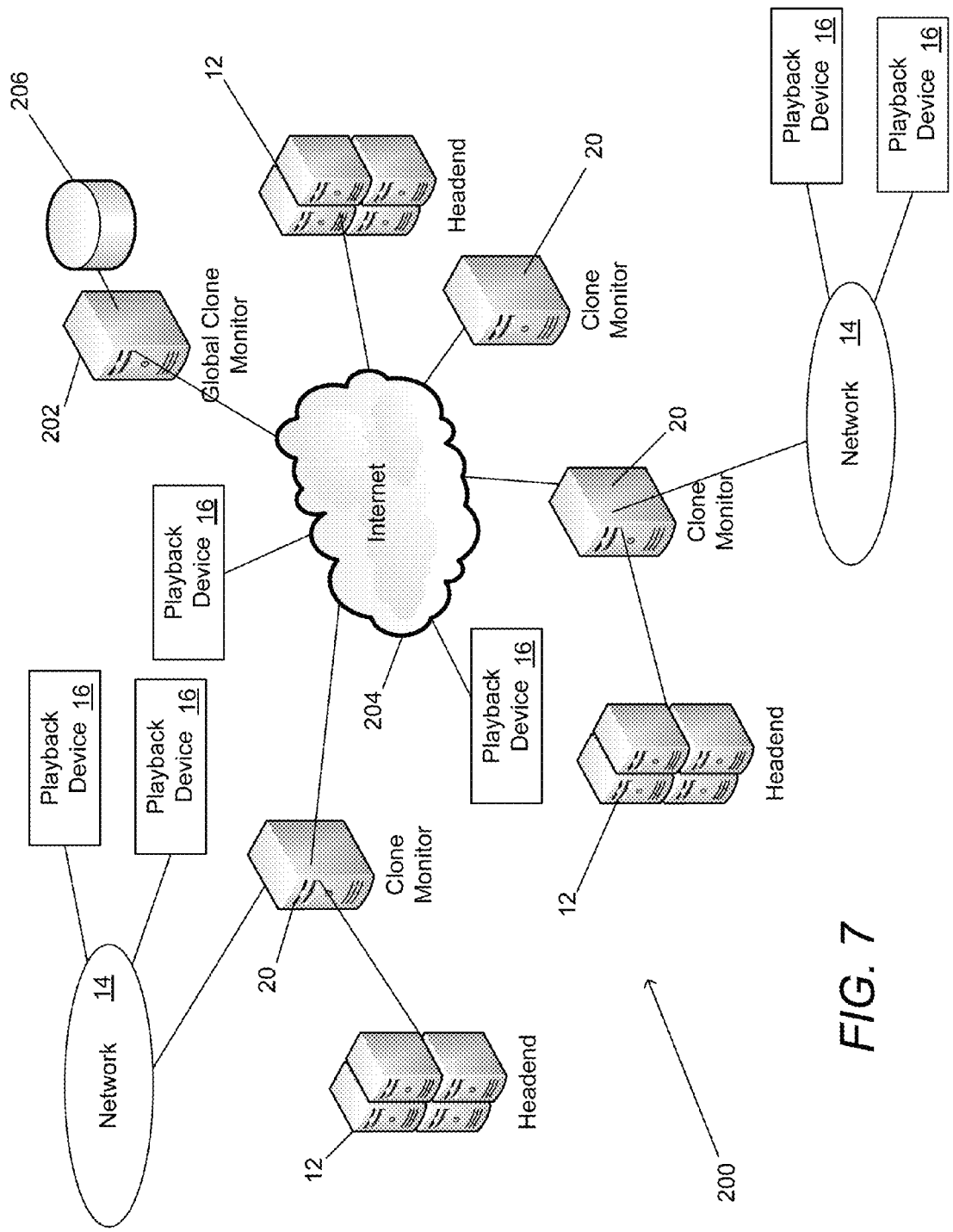
FIG. 7 illustrates a global clone monitoring system including a global clone monitor that aggregates information from clone monitors that collect information from within different content distribution networks in accordance with an embodiment of the invention.

A global clone monitor configured to communicate with clone monitors that collect information from within different content distribution networks in accordance with an embodiment of the invention is illustrated in FIG. 7. The clone monitoring network 200 includes a global clone monitor 202 configured to communicate with a plurality of clone monitors 20 via the Internet 204. In the illustrated embodiment, the global clone monitor 202 aggregates information received from the clone monitors 20 in a database 206. The clone monitors 20 intercept messages between playback devices and headends 12 in various networks. In the illustrated embodiment, the clone monitors 20 monitor messages within content distribution systems that utilize closed networks (such as cable, IPTV, and satellite networks) and within content distribution systems that distribute content via the Internet. Although a specific configuration is shown in FIG. 7, global clone monitors can be utilized in any of a variety of circumstances including where individual clone monitors are utilized to collect information with respect to specific content protection systems within a single content distribution system and/or where individual clone monitors are utilized to collect information with respect to different closed networks within a single content distribution system.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A content distribution network, comprising:
   a plurality of playback devices connected to a headend via a network, where the headend includes at least one content protection system;
   a clone monitor comprising a server comprising a processor and a memory containing a clone monitor server application wherein the clone monitor server application configures the processor to register playback devices based upon a unique identifier supplied by each playback device, when communicating with the at least one content protection system;
   wherein the clone monitor is configured to:
   intercept messages between the plurality of playback devices and the headend;
   store content found within the intercepted messages associated with each playback in the memory, where the content found within the intercepted messages includes at least one request for a cryptographic key;
   aggregate the stored content of messages associated with each playback device over time;
   analyze the aggregated content of messages for at least one pattern of abnormal behavior related to a specific unique identifier supplied by the plurality of playback devices; and
   identify at least one clone playback device based upon the at least one pattern of abnormal behavior, wherein the at least one pattern of abnormal behavior includes number of cryptographic keys issued to the specific unique identifier exceeding a predetermined number.

2. The content distribution network of claim 1, wherein the clone monitor is further configured to forward the intercepted messages to the headend.

3. The content distribution network of claim 1, wherein the at least one content protection system is part of a conditional access system.

4. The content distribution network of claim 1, wherein the at least one content protection system is part of a downloadable conditional access system.

5. The content distribution network of claim 1, wherein the at least one content protection system is part of a digital rights management system.

6. The content distribution network of claim 1, wherein the clone monitor is configured to obtain information from messages transmitted between the playback device and a plurality of content protection systems.

7. The content distribution network of claim 1, wherein the clone monitor is part of the headend.

8. A clone monitor, comprising:
a server comprising a processor and a memory containing a clone monitor server application wherein the clone monitor server application configures the processor to:
receive messages from a plurality of playback devices, where each message is accompanied by a unique identifier;
register the unique identifiers in a database and associate information aggregated from within content of the received messages with the registered unique identifiers;
store content found within the received messages associated with each playback device in the memory, where the content found within the received messages includes at least one request for a cryptographic key;
aggregate the stored content of messages associated with each playback device over time;
analyze the aggregated content of messages for at least one pattern of abnormal behavior related to a specific unique identifier;
forward the received messages to a content protection system; and
identify at least one clone playback device based upon the at least one pattern of abnormal behavior wherein the at least one pattern of abnormal behavior includes number of cryptographic keys issued to the specific unique identifier exceeding a predetermined number.

9. The clone monitor of claim 8, wherein the content protection system is part of a conditional access system.

10. The clone monitor of claim 8, wherein the content protection system is part of a downloadable conditional access system.

11. The clone monitor of claim 8, wherein the content protection system is part of a digital rights management system.

12. The clone monitor of claim 8, wherein the server is configured to decrypt at least a portion of the received messages.

13. The clone monitor of claim 8, wherein the unique identifier is selected from the group consisting of a network address, a random number, an identifier generated from playback device behavior, and a hardware identifier.

14. The clone monitor of claim 8, wherein the content found within the received messages further includes geographic location of a playback device.

15. The clone monitor of claim 8, wherein the at least one request for a cryptographic key includes at least one request for a content decryption key.

16. The clone monitor of claim 8, wherein the clone monitor is configured to block messages including unique identifiers after the detection of a pattern of abnormal behavior.

17. The content distribution network of claim 1, wherein the at least one pattern of abnormal behavior includes number of invalid session keys associated with the specific unique identifier exceeding a predetermined number.

18. The content distribution network of claim 1, wherein the at least one pattern of abnormal behavior includes number of movie keys issued to the specific unique identifier exceeding a predetermined number.

19. The content distribution network of claim 1, wherein the at least one pattern of abnormal behavior includes number of error messages associated with the specific unique identifier exceeding a predetermined number.

20. The content distribution network of claim 1, wherein the at least one pattern of abnormal behavior includes number of session keys issued to the specific unique identifier exceeding a predetermined number.

21. The content distribution network of claim 1, wherein the at least one pattern of abnormal behavior includes number of certificates requested by the specific unique identifier exceeding a predetermined number.

22. The clone monitor of claim 8, wherein the at least one pattern of abnormal behavior includes number of invalid session keys associated with the specific unique identifier exceeding a predetermined number.

23. The clone monitor of claim 8, wherein the at least one pattern of abnormal behavior includes number of movie keys issued to the specific unique identifier exceeding a predetermined number.

24. The clone monitor of claim 8, wherein the at least one pattern of abnormal behavior includes number of error messages associated with the specific unique identifier exceeding a predetermined number.

25. The clone monitor of claim 8, wherein the at least pattern of abnormal behavior includes number of session keys issued to the specific unique identifier exceeding a predetermined number.

26. The clone monitor of claim 8, wherein the at least one pattern of abnormal behavior includes number of certificates issued to the specific unique identifier exceeding a predetermined number.

27. The content distribution network of claim 1, wherein the at least one request for a cryptographic key includes at least one request for a session key.

28. The content distribution network of claim 1, wherein the at least one request for a cryptographic key includes at least one request for a movie key.

29. The content distribution network of claim 1, wherein the content found within the intercepted messages further includes geographic location of a playback device.

30. The content distribution network of claim 1, wherein the at least one request for a cryptographic key includes at least one request for a content decryption key.

31. The clone monitor of claim 8, wherein the at least one request for a cryptographic key includes at least one request for a session key.

32. The clone monitor of claim 8, wherein the at least one request for a cryptographic key includes at least one request for a movie key.

* * * * *